United States Patent [19]
Searfoss

[11] Patent Number: 5,944,374
[45] Date of Patent: Aug. 31, 1999

[54] HINGE FOR A TRUCK BED COVER BOW

[76] Inventor: Timothy Keith Searfoss, 1282 E. M-55, West Branch, Mich. 48661

[21] Appl. No.: 08/868,371

[22] Filed: Jun. 3, 1997

[51] Int. Cl.⁶ .................................................. B60J 7/04
[52] U.S. Cl. ........................................ 296/100.14; 296/98
[58] Field of Search ............................... 296/98, 100.14; 160/69, 70, 78, 79

[56] References Cited

U.S. PATENT DOCUMENTS

| | | | |
|---|---|---|---|
| 1,307,201 | 6/1919 | Hughes | 160/70 |
| 1,717,898 | 6/1929 | Summers | 160/70 |
| 2,997,330 | 8/1961 | Boultinghouse | 296/100.08 X |
| 4,366,979 | 1/1983 | Pillot | 296/100 |
| 5,076,174 | 12/1991 | Martin | 105/377 |
| 5,094,499 | 3/1992 | Simone, Jr. . | |
| 5,125,713 | 6/1992 | Willingham et al. . | |
| 5,211,440 | 5/1993 | Cramaro | 296/98 |
| 5,218,743 | 6/1993 | Miller . | |
| 5,238,287 | 8/1993 | Haddad, Jr. | 296/98 |
| 5,240,304 | 8/1993 | Cramaro et al. . | |
| 5,292,169 | 3/1994 | O'Brian | 296/98 |
| 5,328,228 | 7/1994 | Klassen | 296/98 |
| 5,330,246 | 7/1994 | Bernardo | 296/98 |
| 5,524,953 | 6/1996 | Shaer . | |
| 5,697,663 | 12/1997 | Chenowth . | |
| 5,713,712 | 2/1998 | McIntyre . | |

FOREIGN PATENT DOCUMENTS 187371  11/1936  Switzerland ........................... 160/69

*Primary Examiner*—Dennis H. Pedder
*Attorney, Agent, or Firm*—Brooks & Kushman PC

[57] ABSTRACT

An apparatus is disclosed for supporting a cover over a bed of a truck. The apparatus comprises a bow base disposed proximate a side of the bed, a bow extension, and a shaft fixed to the bow base and rotatable with respect to the bow extension. A plurality of spiral torsion springs each have a first end that extends into an axial groove of the shaft, and a second end that cooperates with a locator pin fixed to the bow extension.

19 Claims, 2 Drawing Sheets

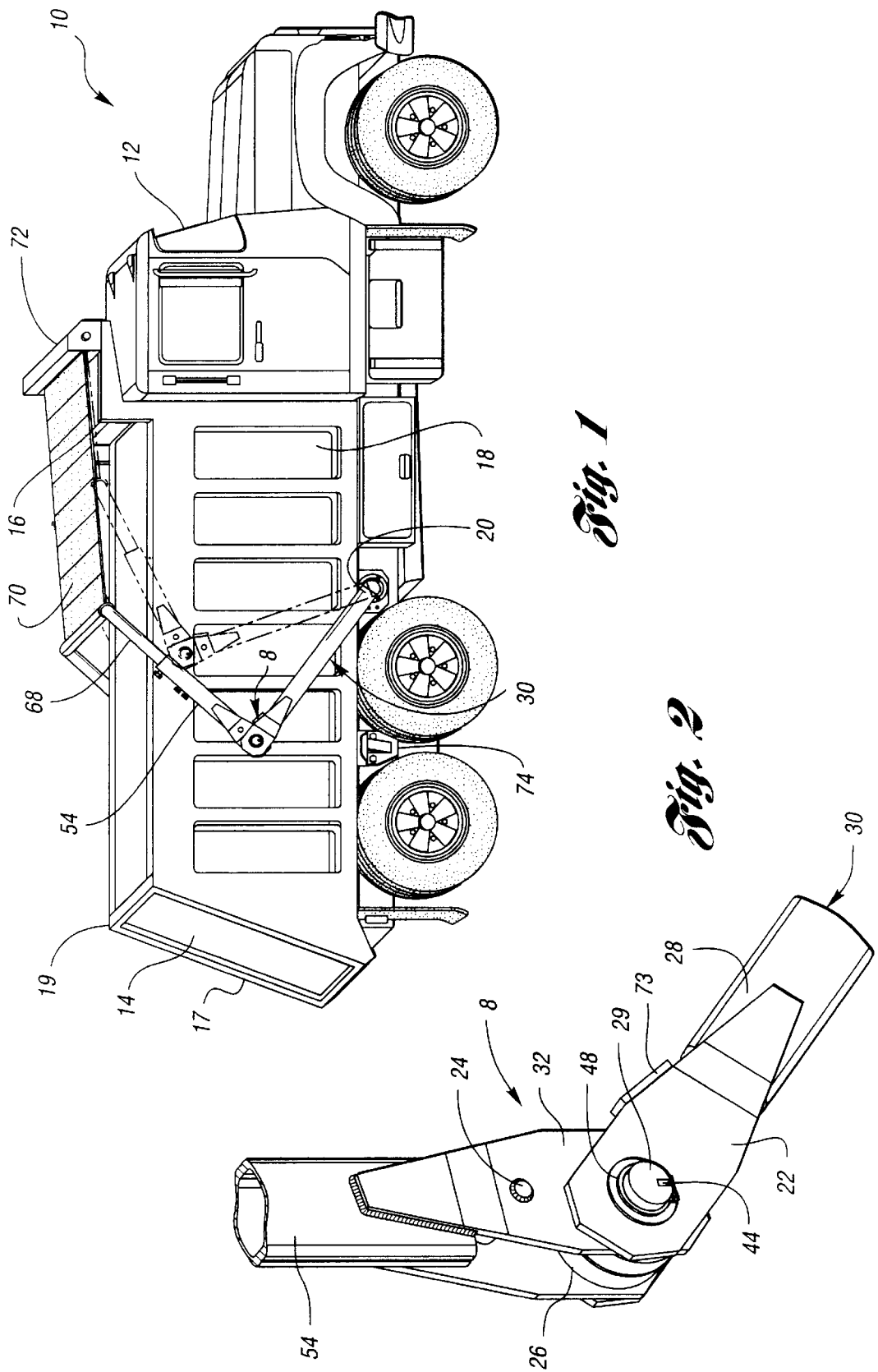

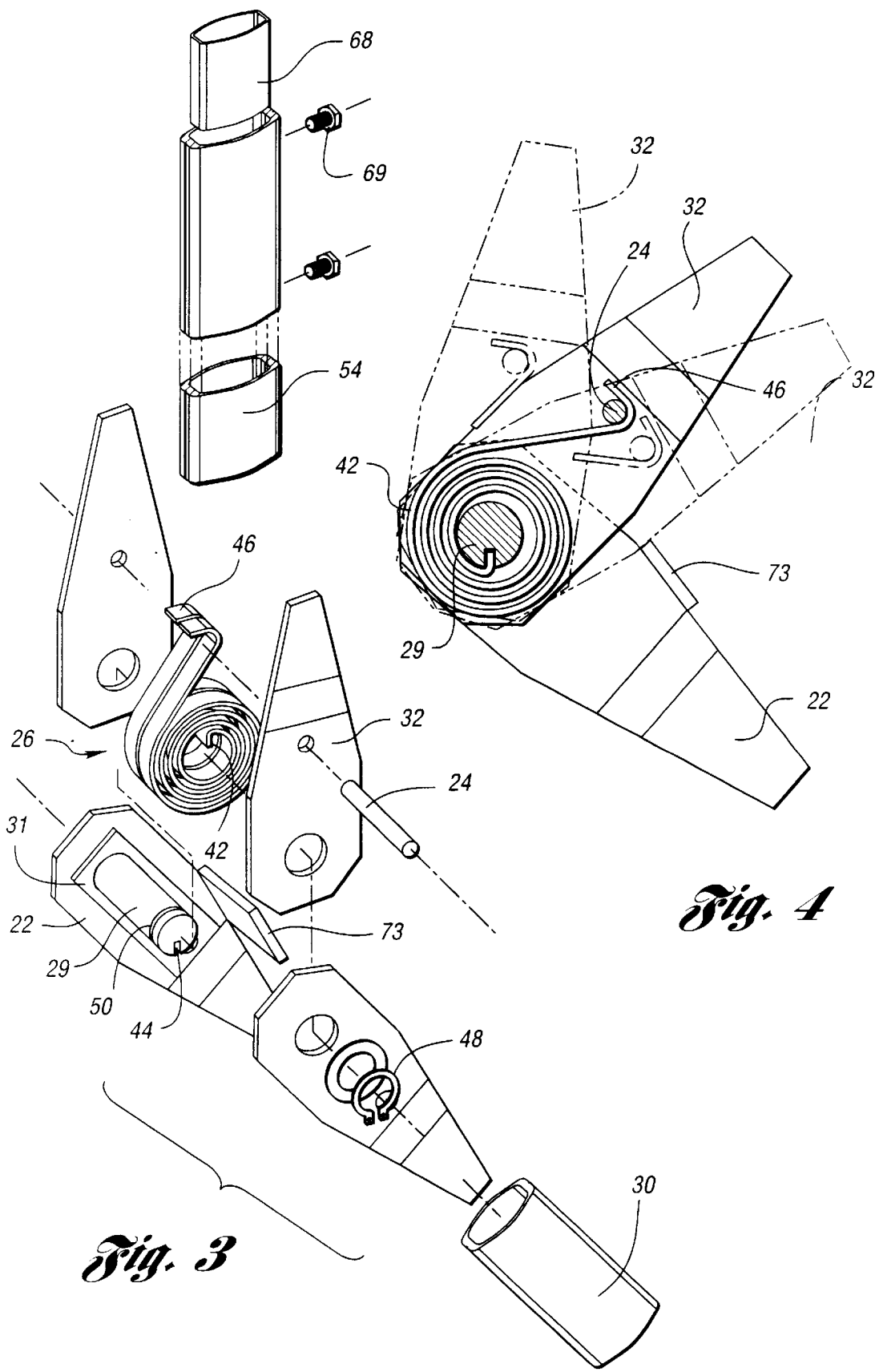

HINGE FOR A TRUCK BED COVER BOW

TECHNICAL FIELD

This invention relates to covers for truck beds, and more particularly to a hinge for a truck bed cover bow.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. An effective truck cover should be one which is easily operated by the truck driver so as to selectively cover and uncover the truck bed from the convenient location of the truck cab while tightly sealing both the front and rear of the truck bed to prevent wind passing under the truck cover and disturbing the truck bed contents.

My U.S. Pat. No. 5,031,955 provides a truck cover which may be conveniently motor operated from the cab of a truck while simultaneously extending the cover over the truck bed and pressing down on the front of the cover proximate a winding assembly which winds up the cover at the front of the truck bed. Similarly, U.S. Pat. No. 5,238,287 shows a front mount telescopic arm truck cover system, and U.S. Pat. No. 5,292,169 shows a truck container cover. Each of these designs and the rest of the prior art, however, is relatively complex and may require extensive welding and metal cutting.

Furthermore, the extensions normally used in conventional truck bed covers have to be long enough to reach from their mounting point to both the front and rear ends of the truck bed. Not only does such an extension require great effort to move from either its forwardmost or rearwardmost position, but it requires a large clearance to accommodate the point in its arcuate path directly above its mounting point.

SUMMARY OF THE INVENTION

The present invention is an apparatus for pivotally connecting a truck cover bow base to a bow extension. The apparatus comprises a shaft and at least one spring. The shaft is fixed to one of the bow base or the bow extension, and is rotatable with respect to the other of the bow base or the bow extension. A first end of the spring is fixed to the shaft, and a second end of the spring cooperates with the other of the bow base or the bow extension.

Accordingly, an object of this invention is to provide an apparatus of the type described above which pivotally connects a truck cover bow base to a bow extension.

Another object of this invention is to provide an apparatus of the type described above which reduces the effort required to move the extension from either its forwardmost or rearwardmost position.

Still another object of this invention is to provide an apparatus of the type described above which requires a smaller clearance than conventional truck bed covers.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a perspective view of a truck including an apparatus according to the present invention for pivotally connecting a truck cover bow base to a bow extension;

FIG. 2 is an enlarged perspective view of the pivot apparatus;

FIG. 3 is an exploded perspective view of the pivot apparatus; and

FIG. 4 is a cross-sectional view of a shaft, spring and locator pin of the pivot apparatus.

BEST MODE FOR CARRYING OUT THE INVENTION

With reference to the drawings, the preferred embodiments of the present invention will be described. FIG. 1 shows an apparatus 8 according to the present invention for pivotally connecting a cover bow base 30 to a bow extension 54 on a truck 10. The truck has a cab 12, and a load bed 14 including front and rear ends 16 and 17 and first and second sides 18 and 19.

FIGS. 2 and 3 show the apparatus 8 in greater detail. The fabricated or die cast aluminum or steel alloy bow base 30 is disposed proximate the right side 18 of the bed, and includes a lower end 20 which is pivotally connected to the underbody of the truck as disclosed in my U.S. patent application Ser. No. 08/812,763 filed Mar. 6, 1997 and entitled Pivot Mounting for a Truck Bed Cover, the disclosure of which is hereby incorporated by reference. A shaft 29 is welded or otherwise fixed to one of a pair of plates 22 extending from an upper end 28 of the bow base 30. The shaft 29 extends through a similar pair of plates 32 extending from the lower end of the extension bow 54 such that the shaft is rotatable with respect to the extension bow.

A locator pin 24 is welded to and extends between the bow extension plates 32 generally parallel to the shaft 29. A plurality of preferably spiral torsion springs 26 are disposed between the plates 22 and 32. One end 42 of each of the springs 26 engages an axial groove 44 formed in the surface of and extending a substantial portion of the length of the shaft 29. The other ends 46 of the springs 26 cooperate with the locator pin 24 such that the bow base 30 is biased toward a home position as described below. Both ends of the shaft 29 may be welded to the plates 22, or either end may be provided with a retainer for retaining the shaft between the plates 22. In one embodiment, the retainer comprises a snap ring 48 disposable in a circumferential groove 50 in a distal end of the shaft. The opposite end of the shaft 29 extends through a hole in the inboard plate 32 and is welded to a mounting plate 31, which in turn is welded or otherwise secured to the outboard plate 22. It should be appreciated that other means may also function to retain the shaft between the plates.

The bow base 30 and the extension 54 both extend generally perpendicularly from the shaft 29 and outside of the plane of the side wall 18 or 19. The bow base 30 and the extension 54 are advantageously formed of extruded aluminum, and have a perimeter designed for strength and to diminish the front-to-back profile presented to the oncoming wind. In a preferred embodiment, the bow base 30 and the extension 54 have a non-circular, generally hexagonal perimeter. The extension 54 also has a generally hexagonal inner surface, but it should be appreciated that this inner surface may have any shape adapted to mate with the corresponding outer surface of a supplemental extension 68.

At least one supplemental extension 68 may be provided on each side of the truck. The supplemental extensions 68 preferably have a perimeter sized to telescope within the hollow extensions 54, and are secured thereto such as by tightening screws 69. As shown in FIG. 1, the supplemental extensions 68 extend up to and engage one end of a flexible cover 70 for extending the cover over the load bed. A winding assembly 72 disposed proximate the front of the truck cooperates with the other end of the cover 70. As the extensions 54 swing toward the rear end 17 of the truck load bed 14, the cover 70 is pulled out of the winding assembly 72 and extended over the load bed. It should be appreciated that a tension bow may also be provided for applying a downward force to the cover 70 proximate the front end 16 of load bed 14 to facilitate holding the cover on the load bed. Further details of this arrangement may be found in my U.S. Pat. No. 5,031,955, the disclosure of which is hereby incorporated by reference.

FIGS. 1 and 4 show that the bow base 30 is movable relative to the truck and to the extension 54 among a fully deployed home position, intermediate positions, and a retracted position. As the bow base 30 is biased toward the rear of the truck by the underbody pivot housing, the springs 26 also bias the extensions 54 and 68 toward the rear of the truck so as to hold the cover 70 in tension toward the rear of the truck. A stop plate 74 is provided on the truck to engage the bow base 30 to prevent overextension. The winding assembly 72 can then be selectively energized to retract the cover and uncover the load bed 14 against the tension force of springs 26 and the springs in the underbody pivot housing. Clockwise rotation of the extension 54 relative to the bow base 30 is limited to slightly more than 90 degrees by a stop plate 73 extending between the plates 22.

By varying the position of the locator pin 24, the number of springs and/or the spring constant of the springs, the force biasing the extensions toward the deployed position is variable. In a preferred embodiment, the force developed by the springs 26 is less than the force developed by the underbody pivot housing so that the knuckle 8 bends before the bow base 30 pivots. A pair of the apparatuses 8, with one disposed on either side of the truck, may be utilized on both flat truck beds and those having raised sides as illustrated in FIG. 1.

The effort required to move the bow base 30, and the extensions 54 from either their forwardmost or rearwardmost position is less than that required in conventional designs because a greater portion of the overall applied force is vectored in the horizontal direction. This is possible because the arc swept out by the leading edge of the cover 70 has a much greater radius, and correspondingly smaller clearance, than conventional truck bed covers.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. An apparatus for pivotally connecting a truck cover bow base to a bow extension, the apparatus comprising:

a shaft fixed to one of the bow base or the bow extension and rotatable with respect to the other of the bow base or the bow extension; and at least one spring having a first end and a second end, the first end of the spring being fixed to the shaft and the second end of the spring cooperating with the other of the bow base or the bow extension.

2. The apparatus of claim 1 wherein the shaft has a groove, and the first end of the spring extends into the groove.

3. The apparatus of claim 1 further comprising a locator pin connected to the other of the bow base or the bow extension and cooperating with the second end of the spring.

4. The apparatus of claim 3 wherein the second end of the spring engages the locator pin.

5. The apparatus of claim 3 wherein the locator pin defines an axis generally parallel to an axis defined by the shaft.

6. The apparatus of claim 1 further comprising a retainer proximate a distal end of the shaft.

7. The apparatus of claim 6 wherein the retainer comprises a snap ring cooperating with a groove in the shaft.

8. The apparatus of claim 1 wherein the at least one spring comprises a spiral torsion spring.

9. The apparatus of claim 1 wherein the bow extension has a non-circular cross-section.

10. The apparatus of claim 1 wherein the bow extension has a generally hexagonal cross-section.

11. The apparatus of claim 1 wherein the bow base has a non-circular cross-section.

12. The apparatus of claim 1 wherein the bow base has a generally hexagonal cross-section.

13. An apparatus for supporting a cover over a bed of a truck, the apparatus comprising:

a bow base disposed proximate a side of the bed;

a bow extension;

a shaft fixed to one of the bow base or the bow extension and rotatable with respect to the other of the bow base or the bow extension; and at least one spring having a first end and a second end, the first end of the spring being fixed to the shaft and the second end of the spring cooperating with the other of the bow base or the bow extension.

14. The apparatus of claim 13 wherein the shaft has a groove, and the first end of the spring extends into the groove.

15. The apparatus of claim 13 further comprising a locator pin connected to the other of the bow base or the bow extension.

16. The apparatus of claim 15 wherein the second end of the spring engages the locator pin.

17. The apparatus of claim 13 further comprising a snap ring cooperating with a groove in the shaft.

18. The apparatus of claim 13 wherein the at least one spring comprises a spiral torsion spring.

19. An apparatus for supporting a cover over a bed of a truck, the apparatus comprising:

a bow base disposed proximate a side of the bed;

a bow extension;

a shaft fixed to the bow base and rotatable with respect to the bow extension, the shaft having an axial groove;

a locator pin connected to the bow extension; and a plurality of spiral torsion springs, each of the springs having a first end and a second end, the first end of each spring extending into the groove of the shaft and the second end of each spring cooperating with the locator pin.

\* \* \* \* \*